United States Patent
Ash et al.

(10) Patent No.: US 9,335,223 B2
(45) Date of Patent: May 10, 2016

(54) CIRCUITS AND METHODS FOR DETERMINING THE TEMPERATURE OF A TRANSISTOR

(71) Applicant: Texas Instruments Incorporated, Dallas, TX (US)

(72) Inventors: Mikel K. Ash, Cedar Park, TX (US); Krishnaswamy Nagaraj, Plano, TX (US); Paul Kimelman, Alamo, CA (US); Steve Vu, Austin, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 532 days.

(21) Appl. No.: 13/866,301

(22) Filed: Apr. 19, 2013

(65) Prior Publication Data

US 2014/0314124 A1 Oct. 23, 2014

Related U.S. Application Data

(60) Provisional application No. 61/696,947, filed on Sep. 5, 2012.

(51) Int. Cl.
*G01K 7/01* (2006.01)
*G01K 7/16* (2006.01)

(52) U.S. Cl.
CPC .................................. *G01K 7/01* (2013.01)

(58) Field of Classification Search
CPC .............. G01K 1/01; G01K 1/16; G01K 1/18
USPC .......... 374/100, 170, 183, 178, 184; 327/512, 327/530, 574
See application file for complete search history.

(56) References Cited

U.S. PATENT DOCUMENTS

| | | | | |
|---|---|---|---|---|
| 3,003,122 A | * | 10/1961 | Gerhard ................. | H03K 17/60 327/478 |
| 3,112,418 A | * | 11/1963 | Peras .................... | F16D 48/064 192/84.1 |
| 3,391,351 A | * | 7/1968 | Trent ...................... | H03K 3/26 327/199 |
| 4,755,741 A | * | 7/1988 | Nelson ............... | H03K 17/0422 307/97 |
| 4,794,274 A | * | 12/1988 | Lohn ................ | H03K 17/04126 323/289 |
| 5,231,316 A | * | 7/1993 | Thelen, Jr. ............. | H03F 1/301 327/103 |
| 5,973,543 A | * | 10/1999 | Shimura .................. | G05F 3/22 327/530 |
| 5,982,221 A | * | 11/1999 | Tuthill ..................... | G01K 7/01 257/E23.08 |
| 6,097,239 A | * | 8/2000 | Miranda, Jr. ............. | G01K 7/01 327/512 |
| 6,198,267 B1 | * | 3/2001 | Bakker .................... | G01K 7/01 323/316 |
| 6,554,469 B1 | * | 4/2003 | Thomson ................. | G01K 7/01 327/512 |
| 6,597,210 B2 | * | 7/2003 | Carsten ............... | H02M 3/1588 327/108 |
| 6,870,357 B1 | * | 3/2005 | Falik ...................... | G01K 15/00 324/71.5 |
| 7,084,695 B2 | * | 8/2006 | Porter .................... | G01K 7/015 327/512 |
| 7,686,508 B2 | * | 3/2010 | Lin ........................ | G01K 7/015 327/512 |
| 8,167,485 B2 | * | 5/2012 | Lin ........................ | G01K 7/015 327/512 |

(Continued)

*Primary Examiner* — Gail Kaplan Verbitsky
(74) *Attorney, Agent, or Firm* — John R. Pessetto; Frank D. Cimino

(57) ABSTRACT

Methods and circuits for measuring the temperature of a transistor are disclosed. An embodiment of the method includes, providing a current into a circuit, wherein the circuit is connected to the transistor. A variable resistance is connected between the base and collector of the transistor. The circuit has a first mode and a second mode, wherein the current in the first mode flows into the base of the transistor and through the resistance and the current in the second mode flows into the emitter of the transistor. Voltages in both the first mode and the second mode are measured using different resistance settings. The temperature of the transistor is calculated based on the difference between the different voltages.

8 Claims, 3 Drawing Sheets

(56) References Cited

U.S. PATENT DOCUMENTS

| | | | | |
|---|---|---|---|---|
| 8,197,127 B2 * | 6/2012 | Zegheru | ............... | G01K 7/01 374/100 |
| 2005/0105586 A1 * | 5/2005 | Sato | ............... | G01K 7/01 374/178 |
| 2006/0029123 A1 * | 2/2006 | Johnson | ............... | G01K 15/00 374/178 |
| 2007/0055473 A1 * | 3/2007 | McLeod | ............... | G01K 1/00 702/130 |
| 2007/0091979 A1 * | 4/2007 | Chiu | ............... | G01K 7/01 374/1 |
| 2010/0002748 A1 * | 1/2010 | Lin | ............... | G01K 7/015 374/170 |
| 2010/0111137 A1 * | 5/2010 | Chen | ............... | G01K 7/01 374/178 |

\* cited by examiner

CIRCUITS AND METHODS FOR DETERMINING THE TEMPERATURE OF A TRANSISTOR

BACKGROUND

Some transistors are used in circuits to provide bandgap voltage references and temperatures sensors. In bandgap references, a transistor is used to generate a constant voltage that is independent of temperature. Temperature sensor circuits use a voltage from a PN junction in a transistor to measure temperature. The temperature sensor circuits require voltage measurements on the transistors at different current densities. Because the gain, which is sometimes referred to as the beta values, may vary with current density, the bandgap and temperature sensor circuits may not be accurate. The problem is especially prevalent with ultra deep submicron CMOS (complimentary metal oxide semiconductor) transistors having low beta values.

SUMMARY

Methods and circuits for measuring the temperature of a transistor are disclosed. An embodiment of the method includes providing a current into a circuit, wherein the circuit is connected to the transistor. A variable resistance is connected between the base and collector of the transistor. The circuit has a first mode and a second mode, wherein the current in the first mode flows into the base of the transistor and through the resistance and the current in the second mode flows into the emitter of the transistor. Voltages in both the first mode and the second mode are measured using different resistance settings. The temperature of the transistor is calculated based on the difference between the different voltages.

DETAILED DESCRIPTION

Circuits and methods that measure the beta ($\beta$) or gain of transistors are described herein. By accurately measuring beta, the temperature of the transistor can be accurately measured. The accurate temperature measurement enables the transistor to be used in precise bandgap voltage generators and other applications.

The beta value of a transistor is very critical when the transistor is used in temperature sensor or bandgap reference circuits. More specifically, slight variations in the beta of a transistor cause variations in the PTAT (proportional to absolute temperature) voltage, which affects the temperature sensing and bandgap reference circuits. The circuits and methods described herein measure or extract the beta of a transistor, such as a PNP transistor, at different current densities. The beta measurements are used to generate a beta compensation factor, which can be used to establish very accurate PTAT voltages. The accurate PTAT voltages are used for accurate temperature measurements. As stated above, accurate temperature measurements enable circuits to generate accurate bandgap voltages. The circuits and methods may be used in low beta PNP devices when biased at different current densities to establish very accurate bandgap voltages and temperature measurements.

Figure 1:
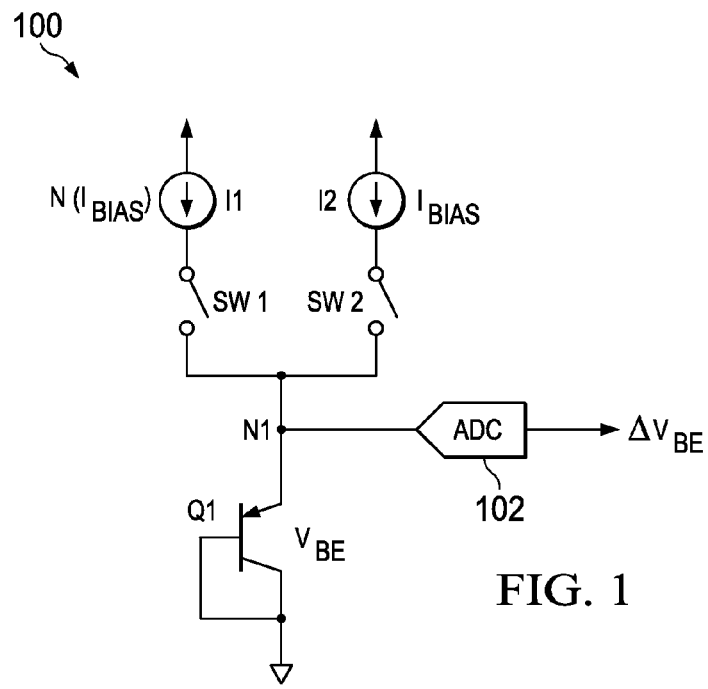
FIG. 1 is a schematic diagram of a circuit for measuring temperature using measured base to emitter voltages of a transistor.

Reference is made to FIG. 1, which shows a circuit 100 that is used to describe beta variations in a transistor Q1. The circuit 100 may be used to measure the temperature of the transistor Q1. The circuit 100 includes two current sources, a first current source I1, and a second current source I2. The second current source I2 generates a current $I_{BIAS}$ and the first current source I1 generates a current $N(I_{BIAS})$, where N is a multiplier. The first current source I1 generates N times the current of the second current source I2 or N times the current $I_{BIAS}$.

The first current source I1 is connected to a first switch SW1 and the second current source I2 is connected to a second switch SW2. The outputs of the switches SW1, SW2 are connected together at a node N1. The emitter of the transistor Q1 is connected to the node N1. The base and collector of the transistor Q1 are returned to ground. The transistor Q1 may be a low beta CMOS transistor located in a semiconductor die. The input of an analog to digital converter (ADC) 102 is connected to the node N1. It is noted that that the ADC 102 may be replaced with a volt meter or other voltage measuring device. In the embodiment described herein, the output of the ADC 102 is a digital representation of the difference between the base to emitter voltages for the two current values ($I_{BIAS}$ and N times $I_{BIAS}$), which is referred to as $\Delta V_{BE}$.

The operation of the circuit 100 will now be described. The current in the collector of the transistor Q1 is equal to the difference between the base current and the emitter current. Either the first switch SW1 or the second switch SW2 will be closed during operation, which will drive the emitter of the transistor Q1 with either a current of $I_{BIAS}$ or $N(I_{BIAS})$. When the first switch SW1 is closed, the base to emitter voltage $V_{BE}$ is sampled by the ADC 102 based on the current $N(I_{BIAS})$ flowing through the transistor Q1. This voltage is sometimes referred to as the voltage $V_{BE1}$. When the second SW2 is closed, the ADC 102 samples the voltage $V_{BE}$ based on the current $I_{BIAS}$ flowing through the transistor Q1. This voltage is sometimes referred to as the voltage $V_{BE2}$. The differences between the voltages $V_{BE1}$ and $V_{BE2}$ is a voltage $\Delta V_{BE}$ and may be integrated.

When the first switch SW1 is closed, the voltage $V_{BE1}$ generated by the collector current $I_{C1}$ is calculated based on equation 1 as follows:

$$V_{BE1} = \frac{\eta k T}{q} \ln\left(\frac{I_{C1}}{I_S}\right) \quad \text{Equation 1}$$

where $I_S$ is the reversed-bias saturation current, $\eta$ is the threshold slope parameter of the transistor Q1, k is the Boltzmann constant ($1.38 \times 10^{-23}$), T is the temperature of the base/emitter junction, and q is the electron charge ($1.69 \times 10^{-19}$). When the switch SW2 is closed, the voltage $V_{BE2}$ generated by the collector current $I_{C2}$ is calculated based on equation 2 as follows:

$$V_{BE2} = \frac{\eta kT}{q} \ln\left(\frac{I_{C2}}{I_S}\right) \quad \text{Equation 2}$$

The difference in $V_{BE}$ voltages, $\Delta V_{BE}$, is derived from equations 1 and 2 and is described by equation 3 as follows:

$$\Delta V_{BE} = \frac{\eta kT}{q} \ln\left(\frac{I_{C1}}{I_{C2}}\right) \quad \text{Equation 3}$$

The collector current $I_{C1}$ is calculated by taking the Beta of the transistor Q1 into account. The current in the collector $I_{C1}$, which occurs when SW1 is closed, is calculated based on equation 4 as follows:

$$I_{C1} = \frac{1}{1+\frac{1}{\beta_1}} I_{E1} \quad \text{Equation 4}$$

where $I_{E1}$ is the emitter current and where $\beta_1$ is the beta at the current density related to $I_{C1}$. When the switch SW2 is closed, the collector current $I_{C2}$ is calculated based on equation 5 as follows:

$$I_{C2} = \frac{1}{1+\frac{1}{\beta_2}} I_{E2} \quad \text{Equation 5}$$

By substituting equations 4 and 5 into equation 3, the voltage difference $\Delta V_{BE}$ becomes the following:

$$\Delta V_{BE} = \frac{\eta kT}{q} \ln\left(\frac{1+\frac{1}{\beta_2}}{1+\frac{1}{\beta_1}} N\right) \quad \text{Equation 6}$$

Assuming that N is equal to 10 and $\eta$ is equal to 1, the temperature T may be calculated using equation 7 as follows:

$$T = \Delta V_{BE} \frac{\frac{q}{\eta k \ln(N)}}{1 + \frac{\ln\left(\frac{1+\frac{1}{\beta_2}}{1+\frac{1}{\beta_1}}\right)}{\ln(N)}} \quad \text{Equation 7}$$

The denominator of equation 7 represents the effect of the beta values on the accuracy of temperature measurement. A slight change in one of the beta values will cause the temperature measurement to be erroneous. If the beta values can be measured accurately, a compensation factor may be calculated that can be applied to cancel this error. The beta compensation factor compensates for beta variations to provide accurate temperature measurements.

Figure 2:
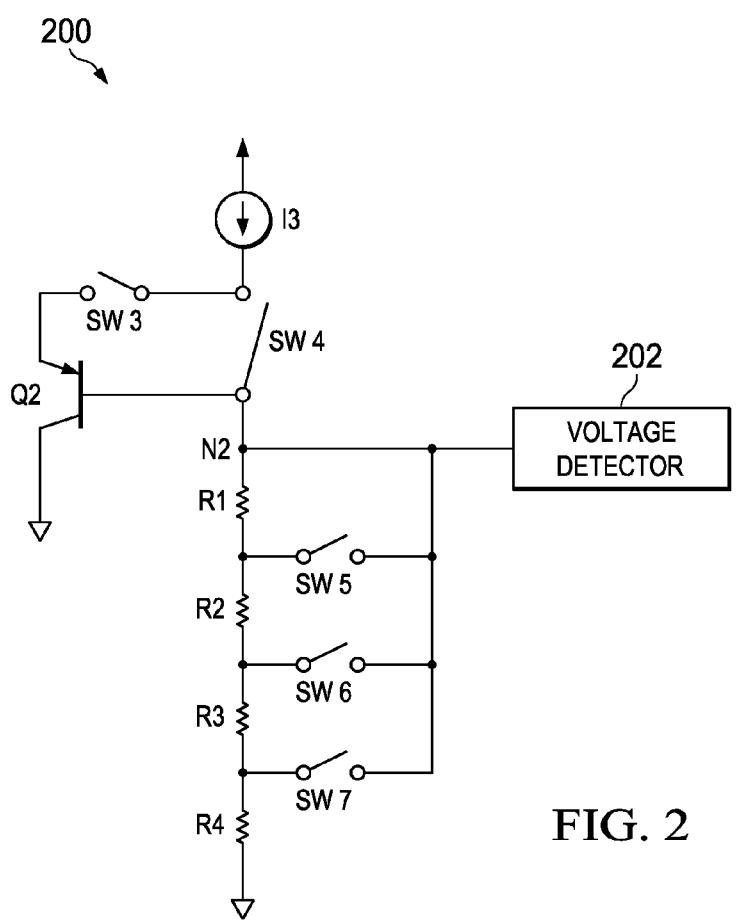
FIG. 2 is a schematic diagram of a circuit for measuring betas of transistors at different current densities.

Having described beta and beta compensation, circuits and methods for determining or extracting beta and using the extracted beta to measure temperature will now be described. Reference is made to FIG. 2, which shows a circuit 200 for measuring the beta of a transistor Q2. The circuit 200 includes a current source I3 that is connected to a switch SW3 and a switch SW4. Both switches SW3, SW4 may be controlled by a controller that is not shown in FIG. 2. The switch SW3 is connected to the emitter of the transistor Q2. The base of the transistor Q2 is connected to the switch SW4 and a node N2. The collector of the transistor Q2 is connected to around.

The node N2 provides a node for measuring a voltage between the base and collector of the transistor Q2 by use of a voltage detector 202. The voltage detector 202 measures a voltage $V_{SNS}$ between the node N2 and ground, which is the voltage between the base and the collector of the transistor Q2. The node N2 is connected to ground by a plurality of resistors R1-R4 connected in series. In some embodiments, the resistor R1 may have a value of 10 kΩ, the resistor R2 may have a value of 5 kΩ, the resistor R3 may have a value of 1 kΩ, and the resistor R4 may have a value of 0.5 kΩ. The junctions of the resistors R1-R4 are connected to the node N2 by way of switches SW5-SW7, so the combination of resistors R1-R4 is sometimes referred to as a variable resistance. It is noted that the individual resistors R1-R4 could be replaced by a variable resistor. The use of the switches SW5-SW7 enables four beta currents to be applied in the circuit 200, which is primarily used to determine the beta in series resistance cancellation circuits, which are described below. By changing the switches SW5-SW7, the base to collector voltage of the transistor Q2 changes, which can be used to keep the full-scale signal into the voltage detector 202 constant for all beta measurements.

The emitter current, $I_E$, in the transistor Q2 is equal to the sum of the collector current, $I_C$, and the base current $I_B$. The collector current $I_C$ is also equal to beta multiplied by the base current. Thus, beta can be described by equation 8 as follows:

$$\beta = \frac{I_E}{I_B} - 1 \quad \text{Equation 8}$$

The current ratio of equation 8 can be measured by measuring the voltage $V_{SNS}$ across the plurality of resistors R1-R4. More specifically, a first voltage $V_{SNS1}$ is measured by the voltage detector 202 when third switch SW3 is open and fourth switch SW4 is closed. A second voltage $V_{SNS2}$ is measured when the third switch SW3 is closed and the fourth switch SW4 is open. The first voltage $V_{SNS1}$ is proportional to the emitter current $I_E$ and the second voltage $V_{SNS2}$ is proportional to the base current $I_B$. By substituting the voltages $V_{SNS1}$ and $V_{SNS2}$ into equation 8 and inverting it, the value of $1/\beta$ is measured using equation 9 as follows:

$$\frac{1}{\beta} = \frac{V_{SNS2}}{V_{SNS1} - V_{SNS2}} \quad \text{Equation 9}$$

The inverse beta values from equation 9 can be substituted into equation 7 in order to determine the temperature of the transistor Q2. It is noted that there will be two measurements of beta using different currents in order to calculate $\beta 1$ and $\beta 2$ as used in equation 7.

Figure 3:
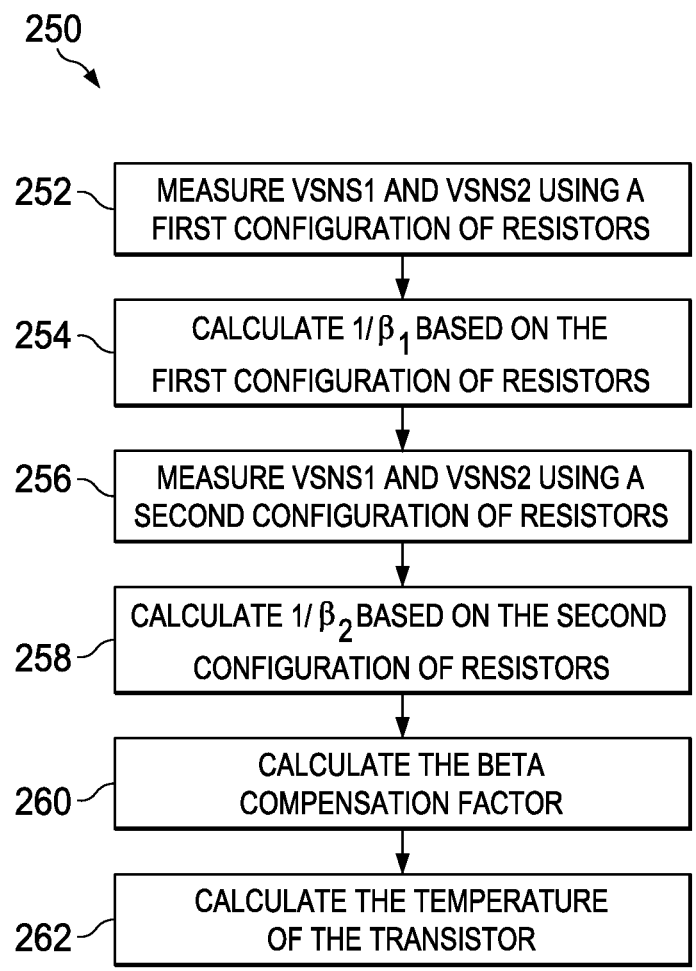
FIG. 3 is a flowchart describing a method of computing a beta compensation factor using the measurements from the circuit of FIG. 2.

Having described the circuit 200, a method of using the circuit 200 to measure the temperature of the transistor Q2 based on the above-described beta compensation will now be described. The description is supplemented by the flowchart 250 of FIG. 3. The method commences at step 252 where the voltages $V_{SNS1}$ and $V_{SNS2}$ are measured using a first configuration of the resistors R1-R4. The first configuration of resistors R1-R4 is established by opening and closing certain switches SW5-SW7. For example, the switches SW5-SW7 may be closed so that the current only passes through the resistor R4. In step 254, the value of $1/\beta_1$ is calculated based on equation 9.

Per equation 7, two values of beta, β1 and β2, are required, so at step 256 $V_{SNS1}$ and $V_{SNS2}$ are measured using a second configuration of resistors R1-R4. For example, all the switches SW5-SW7 may be opened. The second configuration of resistors R1-R4 causes a second current flow through the transistor Q2. In step 258, the value of $1/\beta_2$ is calculated based on $V_{SNS1}$ and $V_{SNS2}$ that were measured using the second configuration of resistors R1-R4.

At this point, values of $1/\beta_1$ and $1/\beta_2$ have been calculated, so the beta compensation factor of equation 7, which is the inverse of the denominator, can be calculated as stated in step 260. The compensated temperature of the transistor Q2 is then readily calculated per equation 7 as described in step 262. It is noted that rather than calculate the natural logarithm functions of equation 7, look up tables may be used based on the different beta values. The result of the temperature measurement described above is a very accurate temperature measurement that takes into account variations in the beta values caused by different current densities.

The methods described above are applicable to many circuits, such as temperature measurement circuits, where two beta values (β1 and β2) are used. In other embodiments, more beta values may be required. For example, in series resistance cancellation (SRC) embodiments or bandgap voltage generation circuits, four values of beta are typically required to be calculated.

Figure 4:
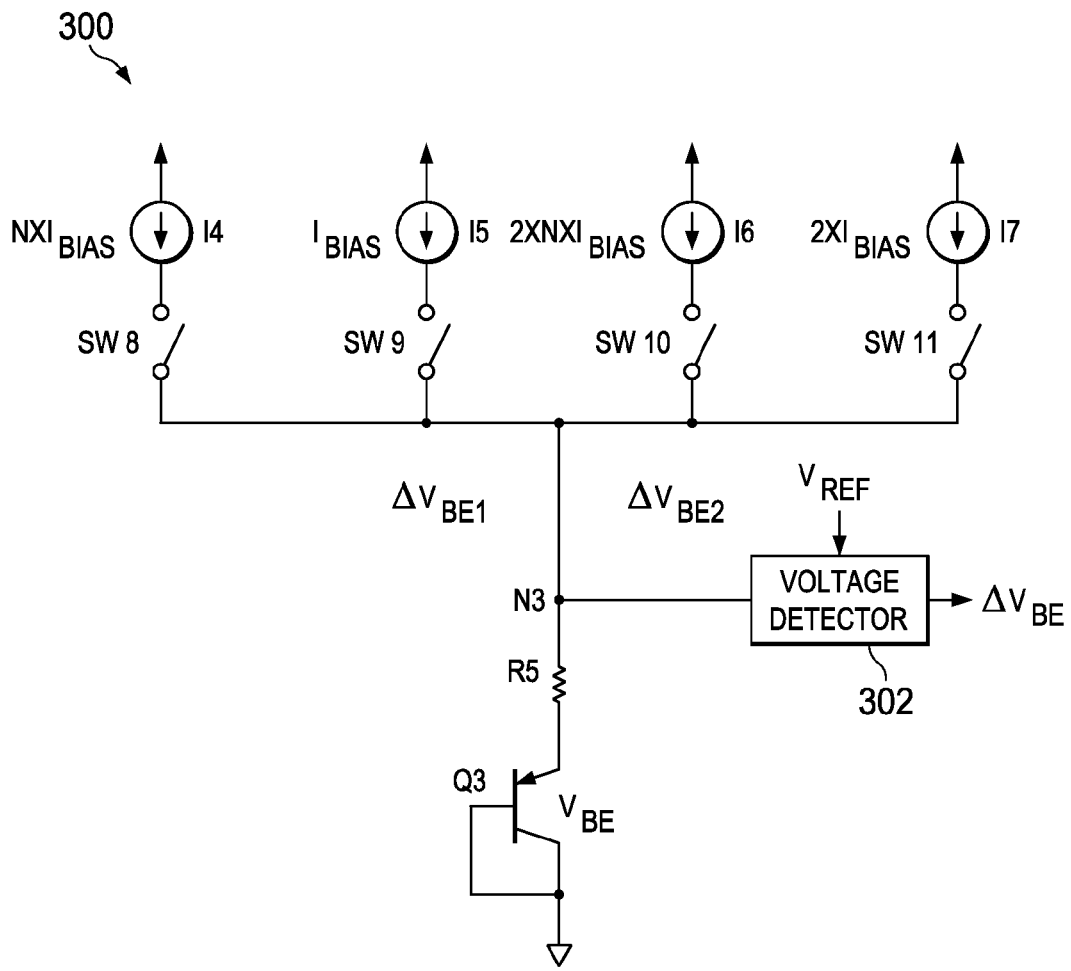
FIG. 4 is a schematic diagram of another circuit for measuring temperature using measured base to emitter voltages of a transistor.

An example of a circuit 300 showing beta error in a SRC configuration is shown in FIG. 4. The circuit 300 has four current sources I4-I7. The current source I4 generates a current that is N times a current $I_{BIAS}$ and is referred to as $NI_{BIAS}$. The current source I5 generates a current that is $I_{BIAS}$. The current source I6 generates a current that is twice $N(I_{BIAS})$ and is referred to as $2NI_{BIAS}$. The current source I7 generates a current that is twice $I_{BIAS}$ and is referred to as $2I_{BIAS}$. The above currents of the current sources I4-I7 are exemplary and other currents may be used by the circuit 300.

The current sources I4-I7 are connected to a node N3 by switches SW8-SW11, respectively. The node N3 is connected to a voltage detector 302, wherein the voltage detector 302 measures the voltage between the node N3 and ground. The node N3 is also connected to the emitter of a transistor Q3 by way of a resistor R5. The base and collector of the transistor Q3 are returned to ground. The circuit 300 provides a baseline for the equations necessary to measure the temperature of the transistor Q3 when in a SRC format. The temperature will be measured using the circuit 300, FIG. 4, as described further below.

The current sources I4 and I5 are used to generate a voltage $\Delta_{V_{BE1}}$ and the current sources I6 and I7 are used to generate a voltage $\Delta V_{BE2}$. For example, the switch SW8 is closed and the remaining switches SW9-SW11 are open. The voltage at the node N3 is measured by the voltage detector 302. Subsequently, the switch SW9 is closed and the remaining switches, SW8, SW10, and SW11 are opened. The voltage at the node N3 is measured again. The difference between the two measured voltages is $\Delta_{V_{BE1}}$. The same is done with the switches SW10 and SW11 to measure the voltage $\Delta_{V_{BE2}}$. Four beta values, β1-β4, are calculated as described above by closing each of the switches SW8-SW11.

Based on the foregoing, the difference in the voltages $\Delta V_{BE}$ is described by equation 10 as follows:

$$2\Delta V_{BE1} - \Delta V_{BE2} = 2\frac{\eta kT}{q}\ln\left(\frac{1+\frac{1}{\beta_2}}{1+\frac{1}{\beta_1}}N\right) - \frac{\eta kT}{q}\ln\left(\frac{1+\frac{1}{\beta_4}}{1+\frac{1}{\beta_3}}N\right) \quad \text{Equation 10}$$

From equation 10, the temperature of the transistor Q3 is readily derived by equation 11 as follows:

$$T = (2\Delta V_{BE1} - \Delta V_{BE2})\frac{\frac{q}{\eta k \ln(N)}}{1 + \frac{2\ln\left(\frac{1+\frac{1}{\beta_2}}{1+\frac{1}{\beta_1}}\right)}{\ln(N)} - \frac{\ln\left(\frac{1+\frac{1}{\beta_4}}{1+\frac{1}{\beta_3}}\right)}{\ln(N)}} \quad \text{Equation 11}$$

Equation 11 can be used with SRC circuits and the circuit 200 of FIG. 2 to determine the temperature of the transistor Q2. It is noted that the factor of twice $\Delta V_{BE1}$ may vary depending on the resistor values and the current flowing through the transistor Q2. By using the circuit 200 of FIG. 2, the temperature measurement can be made without the use of the four current sources of the circuit 300. The method of measuring temperature is the same as described by the flowchart 250 of FIG. 3, except that there are four beta measurements instead of two and there are two voltage differences instead of one. For example, β1 may be measured with all the switches SW5-SW7 closed. The measurement of β2 may be made with switches SW5 and SW6 closed. The measurement of β3 may be made with the switch SW5 closed and the measurement of β4 may be made with all the switches SW5-SW7 open.

The circuits and methods described above enable accurate temperature measurements of transistors. These accurate measurements can be used to generate very accurate bandgap voltage references and other circuits.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. A circuit for measuring the temperature of a transistor, the circuit comprising:
  a current source;
  a first switch connected between the current source and the emitter of the transistor;
  a second switch connected between the current source and the base of the transistor;
  a node connected to the base of the transistor and the first switch;
  a voltage detector connected to the first node;
  a variable resistance connected in series between the node and a common voltage;
  wherein the collector of the transistor is connected to the common voltage; and
  wherein when the first switch is closed, the second switch is open, and when the first switch is open, the second switch is closed.

2. The circuit of claim 1, wherein the variable resistance comprises:
a plurality of resistors connected in series between the node and the common voltage; and
a plurality of third switches connected between at least one of the junctions of the plurality of resistors and the node.

3. The circuit of claim 2, wherein the plurality of resistors comprises four resistors, a first resistor connected to a second resistor, the second resistor being connected to a third resistor, and the third resistor being connected to a fourth resistor; the value of the second resistor being twice the value of the first resistor; and the value of the fourth resistor being twice the value of the third resistor.

4. The circuit of claim 1, wherein the common voltage is ground.

5. The circuit of claim 1, wherein the circuit is operable to:
measure a first voltage at the node when first switch is open and the second switch is closed; and
measure a second voltage at the node when the first switch is open and the second switch is closed;
change the resistance value between the node and the common voltage;
measure a third voltage at the node when first switch is open and the second switch is closed; and
measure a fourth voltage at the node when the first switch is open and the second switch is closed.

6. The circuit of claim 5, wherein the temperature is proportional to the difference between the first voltage and the second voltage and the difference between the third voltage and the fourth voltage.

7. The circuit of claim 1, wherein the circuit is operable to:
set the variable resistance to a first value;
measure a first voltage at the node when first switch is open and the second switch is closed; and
measure a second voltage at the node when the first switch is open and the second switch is closed;
change the variable resistance to a second value;
measure a third voltage at the node when first switch is open and the second switch is closed; and
measure a fourth voltage at the node when the first switch is open and the second switch is closed;
change the variable resistance to a third value;
measure a fifth voltage at the node when first switch is open and the second switch is closed; and
measure a sixth voltage at the node when the first switch is open and the second switch is closed;
change the variable resistance to a fourth value;
measure a seventh voltage at the node when first switch is open and the second switch is closed; and
measure an eighth voltage at the node when the first switch is open and the second switch is closed.

8. A circuit for measuring the temperature of a PNP transistor, the circuit comprising:
a current source having an output;
a first switch connected between the output of the current source and the emitter of the transistor;
a second switch being connected between the output of the current source and the base of the transistor;
a node connected to the base of the transistor and the first switch;
a voltage detector connected to the first node;
a plurality of resistors connected in series between the node and ground; and
a plurality of third switches connected between at least one of the junctions of the plurality of resistors and the node;
wherein the collector of the transistor is connected to ground; and
wherein when the first switch is closed, the second switch is open, and when the first switch is open, the second switch is closed.

* * * * *